G. G. LOBDELL.
Car Wheel.
No. 79,842.
Patented Jan. 14, 1868.
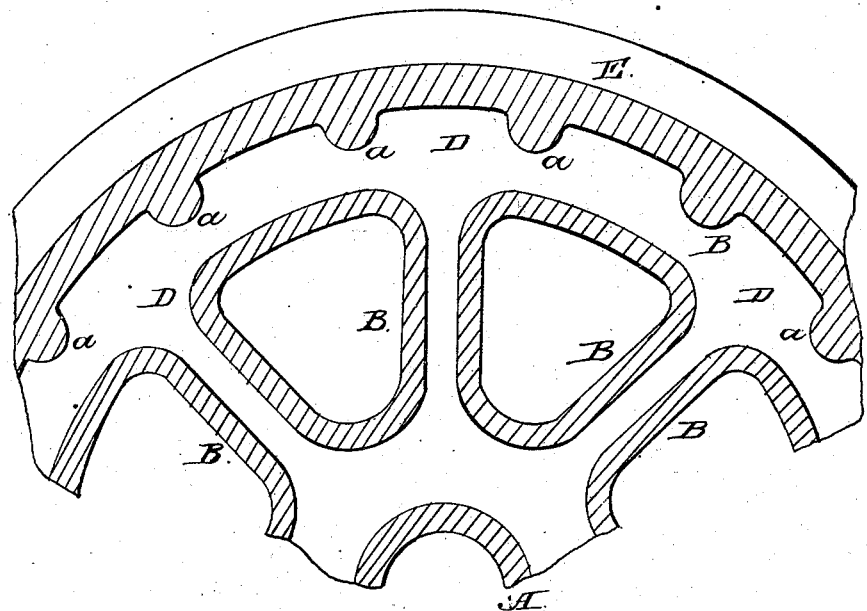
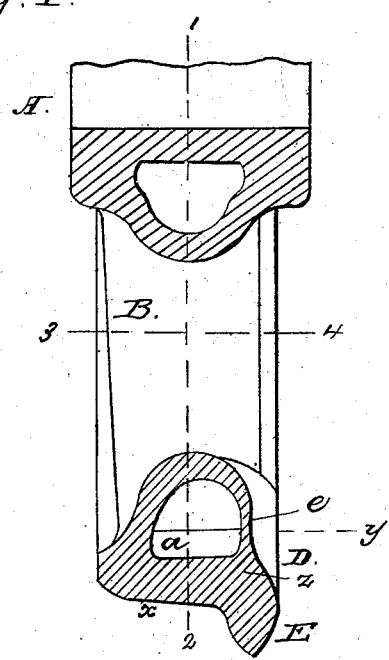
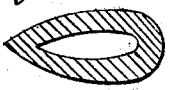
Witnesses
Wm. Adler
John Parker
Inventor
G. G. Lobdell
By his atty
H. Howson

United States Patent Office.

GEORGE G. LOBDELL, OF WILMINGTON, DELAWARE.

Letters Patent No. 79,812, dated July 14, 1868.

IMPROVEMENT IN CAST-IRON CAR-WHEELS.

*The Schedule referred to in these Letters Patent and making part of the same.*

TO ALL WHOM IT MAY CONCERN:

Be it known that I, GEORGE G. LOBDELL, of Wilmington, Newcastle county, Delaware, have invented an Improvement in Cast-Iron Car-Wheels; and I do hereby declare the following to be a full, clear, and exact description of the same.

My invention relates to an improvement in that class of cast-iron car-wheels which have hollow rims, spokes, and hubs; and my improvement consists in making the flanged side of the hollow rim straight, instead of curved and depressed, as usual, this flanged side being continued straight beyond the internal strengthening-ribs, and being at right angles, or nearly so, to the latter, all as described hereafter, so as to increase the strength of the hollow rim, and facilitate the casting of the same with the strengthening-rib.

In order to enable others skilled in the art to make my invention, I will now proceed to describe the mode of carrying the same into effect, reference being had to the accompanying drawing, which forms a part of this specification, and in which—

Figure 1 is a vertical section of part of a car-wheel with my improvement,

Figure 2 a section on the line 1-2, fig. 1, and

Figure 3 a section through one of the spokes on the line 3-4, fig. 1.

Similar letters refer to similar parts throughout the several views.

A represents part of the hub of the wheel, B B B three of the spokes, D the rim, and E the flange.

The hub, spokes, and rim are made hollow, as shown in figs. 1 and 3, the interior of the hub communicating with the interior of the spokes, and the latter with the interior of the rim, as shown in fig. 2.

In constructing car-wheels of this class, considerable difficulty has been experienced in making the rim sufficiently strong. In some cases attempts have been made to attain the desired strength by an increased thickness of tread, that is, an increased thickness of metal on the line $x$, fig. 1, but it is well known to those familiar with the construction of cast-iron car-wheels that the thicker the tread the less perfect is the chill.

The most common plan of strengthening the rim has been the introduction of ribs, $a$ $a$, which extend across the opening in the rim, and are arranged throughout the inside of the latter at suitable intervals and at equal distances apart, as shown in figs. 1 and 2.

Heretofore it has been the practice to make the hollow rim of the form indicated by red lines, so that the inner space is contracted in width, an objectionable feature, owing to the difficulty in casting the internal ribs in the rim, and owing to the fact that the wheel is weakened at the point where strength is most necessary, for fractures of wheels of this class mostly occur in the direction pointed out by the red line $z$.

It will be seen that in my improved wheel the flanged side of the rim, instead of being depressed, is made with a straight face continued beyond the strengthening-rib, the edge of which is represented by the line $y$, fig. 1, the straight side of the rim being at right angles, or nearly so, to this line.

By this arrangement the rim has an inward sectional area, the strengthening-ribs $a$ can be introduced without interfering with the ready casting of the wheel, and the straight mass of metal, $e$, arranged at right angles to the rib $a$, adds greatly to the strength of the rim, as will be readily understood by reference to fig. 1.

I claim as my invention, and desire to secure by Letters Patent—

A cast-iron car-wheel, having a hollow rim with transverse strengthened ribs $a$, where the flanged side of the said hollow rim is made straight, and at right angles, or nearly so, to the said internal ribs, as set forth, for the purpose specified.

In testimony whereof, I have signed my name to this specification, in the presence of two subscribing witnesses.

GEORGE G. LOBDELL.

Witnesses:
JOHN WHITE,
W. J. R. DELANY.